United States Patent [19]

Starkweather

[11] 3,974,506
[45] Aug. 10, 1976

[54] SCANNING SYSTEM FOR IMAGING CHARACTERS COMBINED WITH GRAPHIC CURVES

[75] Inventor: Gary Keith Starkweather, Saratoga, Calif.

[73] Assignee: Xerox Corporation, Stamford, Conn.

[22] Filed: Dec. 30, 1974

[21] Appl. No.: 537,638

[52] U.S. Cl. .............................. 346/45; 178/6.6 A; 346/109; 355/16
[51] Int. Cl.² .......................................... G01D 9/28
[58] Field of Search ............................ 355/16, 3 R; 101/DIG. 13; 346/45, 49, 74 ES, 74 L, 74 P, 109; 178/6.6 A, 6.7 R

[56] References Cited
UNITED STATES PATENTS

| | | | |
|---|---|---|---|
| 3,081,458 | 3/1963 | Lee | 346/45 |
| 3,276,030 | 9/1966 | Stauffer | 346/109 X |
| 3,448,458 | 6/1969 | Carlson et al. | 178/6.7 R |
| 3,495,270 | 2/1970 | Badger et al. | 346/109 |
| 3,506,779 | 4/1970 | Brown et al. | 101/DIG. 13 |
| 3,659,936 | 5/1972 | Klose et al. | 355/3 R |
| 3,720,785 | 3/1973 | Van Auken | 101/DIG. 13 |
| 3,750,189 | 7/1973 | Fleischer | 346/74 ES |

Primary Examiner—R.L. Moses
Attorney, Agent, or Firm—Sheldon F. Raizes

[57] ABSTRACT

A flying spot scanning system is provided which has a separate scanning system for imaging characters onto a recording medium and has a separate x- y galvanometer operated mirror scanning system for imaging a graphic curve onto the recording medium.

7 Claims, 2 Drawing Figures

SCANNING SYSTEM FOR IMAGING CHARACTERS COMBINED WITH GRAPHIC CURVES

DESCRIPTION OF THE INVENTION

Flying spot raster scan systems are well known for imaging characters onto a recording medium. When an image which requires both a graphic curve and characters is desired, it is customary to perform a vector to raster scan conversion for the graphic portion of the image. The hardware requiremens for this conversion are expensive and the speed for such conversion is slow when compared to the other functions the hardware performs in raster scan imaging.

It is an object of this invention to provide a flying spot scanning system which is capable of producing an image of characters combined with a graphic curve which, when comparing the portion of the above mentioned system attributable to generating a graphic curve, utilizes less hardware than the above mentioned system and requires less time for conversion of x-y coordinates of the curve to suitable imaging information.

It is proposed to carry out the above object by providing a flying spot scanning system which has a separate scanning system for imaging characters onto a recording medium and has a separate x-y galvanometer operated mirror scanning system for imaging a graphic curve onto the recording medium.

Other objects of the invention will become apparent from the following description with reference to the drawing wherein.

Figure 1:
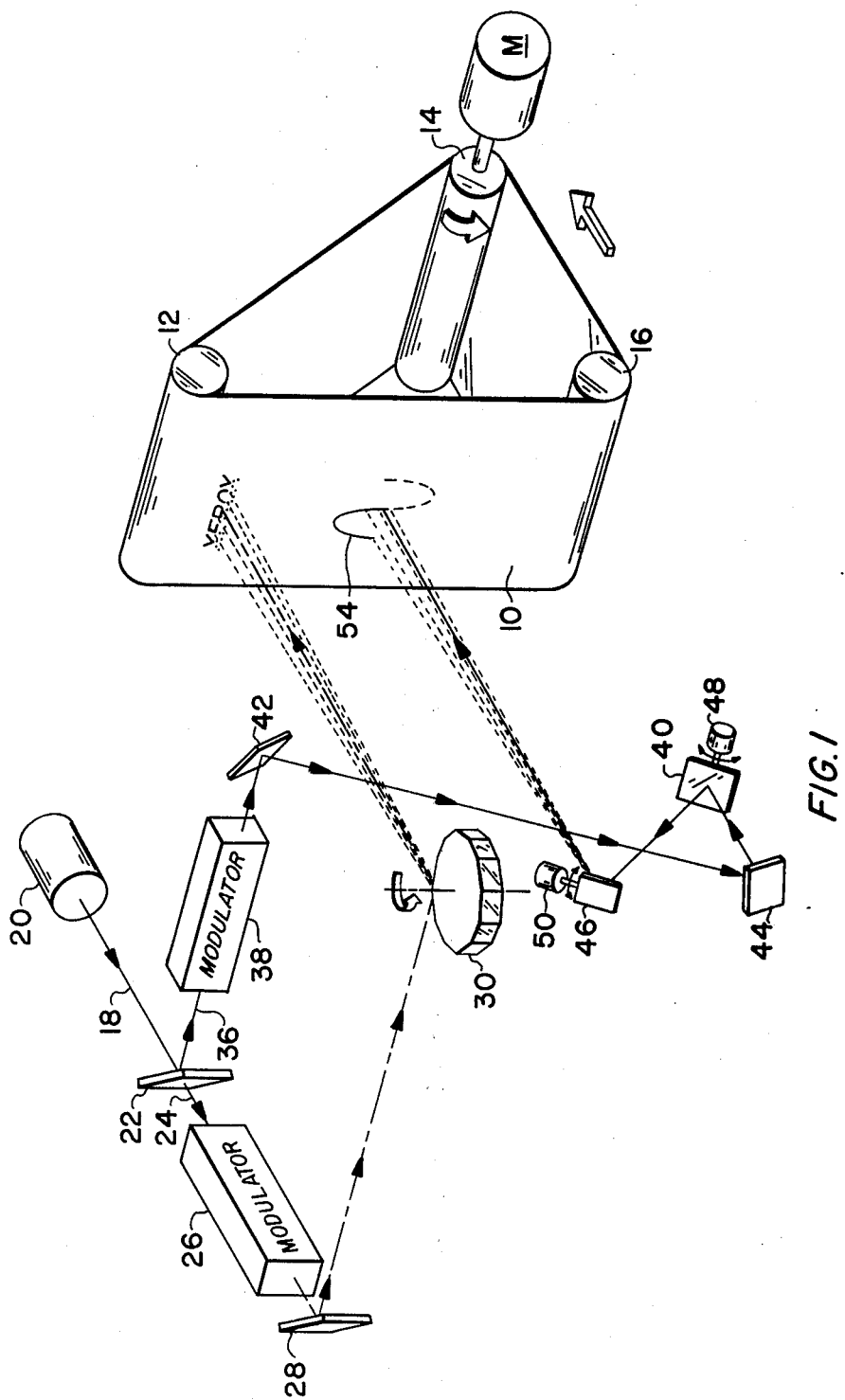
FIG. 1 is a general overall view of the system employed in this invention.
Figure 2:
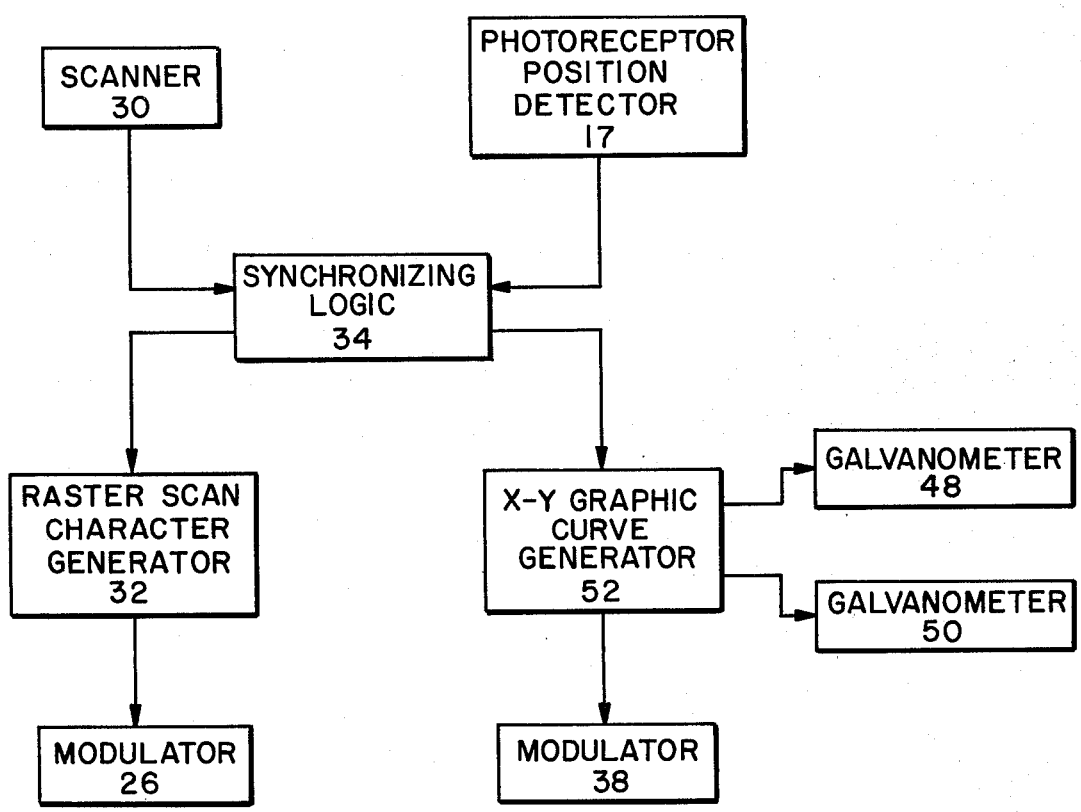
FIG. 2 is a functional schematic diagram.

Referring to the figures, the invention to be disclosed is particularly adaptable for use with a belt type photoreceptor or recording medium 10 which may comprise a belt coated with selenium. The photoreceptor is charged by a corotron by well-known methods and is discharged where the beam strikes the photoreceptor thereby creating a latent image. The discharged areas on the photoreceptor 10 are developed with toner particles by well-known reversal development methods and thereafter the developed image is transferred to a copy medium again by well-known methods. The belt is wrapped around three rolls 12, 14 and 16 with a generally flat imaging portion being formed between rolls 12 and 16. Roll 14 is driven by a motor M in a counterclockwise direction and there is a frictional contact between the drive roll 14 and the inner surface of the belt 10 to provide a driving connection therebetween to thereby rotate the belt 10 in a counterclockwise direction also. A photoreceptor position detector 17 is included in this system. Such detector may be standard encoder (not shown) which comprises a perforated disc (not shown) attached to the drive roll 14 with a photocell (not shown) located on one side of the disc and a light source (not shown) located on the other side of the disc. A certain length of the photoreceptor 10 may be represented by a given number of pulses generated.

A collimated beam 18 is generated by a laser 20. A beam splitter 22 is in the path of the beam 18 and allows a portion 24 of the beam to pass therethrough to an acousto-optic modulator 26 and thereafter to a mirror 28 which directs the beam 24 to a rotating polygon scanner 30 which sweeps the beam as a spot across the moving photoreceptor belt 10 one scan line at a time transverse (in x direction) to the direction of movement of the photoreceptor. The beam 18, 24 stays in substantially the same horizontal plane from the laser to the photoreceptor. The polygon scanner 30 provides only an x scan on the photoreceptor while rotational movement of the photoreceptor 10 provides a y scan permitting a new scan line to be imaged onto the photoreceptor on each sweep of the beam 24 by the scanner 30.

A character generator 32 interfaces with the modulator 26 to modulate the beam to print out a desired character during scanning. Synchronizing logic 34 is interfaced with polygon scanner 30, the character generator 32 and the photoreceptor position detector 17 to modulate the beam 24 at the proper time to print out a desired character at the proper location on the photoreceptor 10 as the beam 24 sweeps across the photoreceptor scan line by scan line.

The portion 36 of the beam 18 which is reflected from the beam splitter 22 is passed through an acousto-optic modulator 38 and is directed to a galvanometer operated mirror 40 by mirrors 42 and 44. Mirror 42 directs the beam vertically downwards at an angle with a horizontal plane and mirror 44 is at a proper angle to deflect beam 36 along a horizontal plane to mirror 40. A galvanometer operated mirror 46 is located vertically above the mirror 40 and is positioned to receive the beam which is reflected from the mirror 40. The mirror 46 reflects the beam 36 as a spot onto the photoreceptor 10. The mirror 40 is rotatable about a horizontal axis and the mirror 46 is rotatable about a vertical axis and are so positioned relative to each other that the beam 36 will be scanned vertically relative to the mirror 46 to provide a y scan of the beam 36 while the mirror 46 provides an x scan of the beam 34 thus resulting in an angular trace of the beam 36 on the photoreceptor 10 during scanning of the beam 36 thereon. The graphic scanner is so located to scan a flat area on the photoreceptor 10 which is vertically below the photoreceptor area onto which the beam 24 is being scanned.

The galvanometers 48 and 50 for oscillating mirrors 40 and 46, respectively, respond to increases or decreases in voltage to position the mirrors accordingly. A graphic generator 52 is interfaced with the modulator 38 and the galvanometers 48 and 50 to control the voltages applied to the galvanometers to trace out a graphic image such as curve 54. The graphic generator 52 is also interfaced with the synchronizing logic 34 to generate its particular image at the proper time.

The optical system for imaging the beams 24 and 36 as a spot onto the photoreceptor 10 have not been shown for simplicity as such optical systems are well known. The graphics scanning system disclosed readily converts an x-y plot of a curve to stroke techniques through readily available specially designed software for such applications which effects voltage changes being imparted to the galvanometers to thereby control the deflection of the beam. The hardware required to convert the x-y plot of a curve for raster scanning is very expensive compared to the cost of a graphics scanning system. While the x-y galvanometer operated scanners are slower speed than a raster scanner, the overall scanning time for a reasonable curve is often much less than the period it would take to scan over the same area in a raster scan mode. Thus, the graphic curve system is cheaper than and converts faster than the additional hardware required in the raster scan system for generating curves resulting in a relatively simple and less expensive system for creating images of characters combined with a graphic curve.

This invention may also be applied to a system where the characters are formed by stroke generation instead of by raster scan. In this mode, a vertical beam deflector and a horizontal beam deflector would be placed between the modulator 26 and the polygon scanner 30 to deflect the beam in x and y directions to stroke a character at a time as the polygon sweeps across the photoreceptor 10 a text line at a time.

It is essential that the area of the photoreceptor on which a curve is imaged be generally planar since the beam 36 may be vertically reversed over large areas in tracing out a curve. The area of the photoreceptor on which the beam 24 images characters may be planar or may be curved since very small areas are involved.

Thus, one can readily see that the objects of the invention have been achieved by the above described system.

What is claimed is:

1. A system for imaging characters and a graphic curve onto a recording medium comprising: a recording medium, a first beam of light, means for modulating said first beam, a rotatable polygon scanner located between said recording medium and said modulating means and in the path of said modulated first beam for scanning said first beam onto said recording medium and forming character images thereon, a second beam of light, means for modulating said second beam of light, first and second galvanometer operated mirrors, one of said mirrors being rotatable about a horizontal axis, the other of said mirrors being rotatable about a vertical axis, said first mirror being located between said modulating means for said second beam and said second mirror and in the path of said second beam, said first mirror reflecting said beam onto said second mirror, said second mirror reflecting said beam onto said recording medium to form a graphic curve image thereon, said first and second beams striking said recording medium at vertically spaced locations, said recording medium being generally planar at least at the location that said beam strikes the same.

2. A system as recited in claim 1 wherein said first and said second beam are generated from the same source of illumination.

3. A system as recited in claim 2 wherein said source of illumination is a laser.

4. A system as recited in claim 1 wherein said recording medium comprises an endless belt.

5. A system as recited in claim 1 wherein said recording medium comprises an endless belt coated with selenium.

6. A system as recited in claim 3 wherein said first and second beams are separated from each other by a beam splitter located between said modulating means for each beam and said laser.

7. A system as recited in claim 1 wherein said recording medium comprises an endless belt, said belt being generally planar at the locations that said first and second beams strike the same.

* * * * *

UNITED STATES PATENT AND TRADEMARK OFFICE
CERTIFICATE OF CORRECTION

PATENT NO. : 3,974,506
DATED : August 10, 1976
INVENTOR(S) : Gary Keith Starkweather It is certified that error appears in the above-identified patent and that said Letters Patent are hereby corrected as shown below:

Column 2, line 30, insert --36-- after "beam".

Column 4, line 6, insert --second-- after "said" (first occurrence).

Column 4, line 12, insert --second-- after "said".

Signed and Sealed this

Twenty-eighth Day of December 1976

[SEAL]

Attest:

RUTH C. MASON
Attesting Officer

C. MARSHALL DANN
Commissioner of Patents and Trademarks